Patented Apr. 8, 1924.

1,489,477

UNITED STATES PATENT OFFICE.

ROBERT M. BOWES AND CHARLES E. BOWES, OF INDIANAPOLIS, INDIANA.

PROCESS FOR RUBBER PATCHES.

No Drawing. Application filed July 18, 1921. Serial No. 485,653.

*To all whom it may concern:*

Be it known that we, ROBERT M. BOWES and CHARLES E. BOWES, citizens of the United States, residing at Indianapolis, in the county of Marion and State of Indiana, have invented new and useful Improvements in Processes for Rubber Patches, of which the following is a specification.

This invention is an improvement in the process of applying rubber patches to the inner-tubes of pneumatic tires. The present prevailing practice is to cause the patch to adhere by the aid of a cement or other adhesive material placed between the punctured tube and the patch. The cement, which is generally heated to render it sufficiently fluid for application, becomes too soft and fluid to properly hold the patch when the mended tire is overheated by fast driving, or by contact with hot pavements or other road surfaces. As a result the cement is forced out, loosening the patch and reopening the puncture.

The object of this invention is to remove the glazed surface always formed on the tube in the process of its manufacture, together with the rubber that has become deteriorated by atmospheric action, and to provide a clean new soft surface of substantially the same nature and condition as the protected surface of the patch to be applied, whereby there will be a perfect welding of the rubber tube and patch when the latter is applied and the surfaces are pressed together.

To soften the surface of the punctured tube that it may be removed by buffing, we apply the following composition:

| | Parts. |
|---|---|
| Coal tar (100%) benzol | 5 |
| Carbon tetra-chloride | 3 |
| Ether U. S. P. sulphuric | 1 |
| Carbon di-sulphide | 1 |

Into this mixture we dissolve a sufficient amount of what is commercially known as first latex white crêpe rubber to bring it to the consistency of ordinary mixed paint,— say approximately one to one and a half pounds to 3 gallons of the liquid, as per the above formula.

The coal tar benzol is the chief rubber softening element, the activity of which is increased by the ether sulphuric and carbon di-sulphide. The last two ingredients would act as excellent softeners without the first but they are too expensive for popular commercial use. The white crêpe rubber gives a body to the preparation and makes it spread more satisfactorily, and the carbon tetra-chloride reduces the inflammability.

The proportions of the above ingredients may be varied, or one or more, other than the coal tar benzol, may be entirely eliminated without entirely destroying the value of the preparation; but the combination of all of the ingredients in proportions above given has been found to produce the best results in practice.

The resulting composition is a fluid of the consistency of mixed paint as above stated, and it is applied like paint to the area to be covered by a patch. A minute or two after the application is made the treated surface is buffed with a wood-rasp or like acting instrument, to loosen the surface. Then the composition is worked with a knife-blade thoroughly into the pores of the rubber opened by the buffing process, after which it is entirely removed by scraping. The surface must be scraped clean and dry with the blade of a knife, leaving no accumulation and no dampness. The treated surface is now ready for the application of the rubber patch. This may be obtained from the commercial patch material furnished in strips, having a surface for contact protected by canvas which is peeled off and the application made to the prepared tube surface without fingering either of the surfaces to be united.

The best results are obtained by cutting the patch to the required size, with beveled edges made by holding the scissors obliquely to the patched surface while cutting, the bevel being made outwardly toward the tube-contacting surface, thus making that surface the larger of the two, with a thin feather-edge next to the tube which readily welds in a hair-line that cannot be felt with the thumb or finger nail. Besides securing a much heater appearance, the beveled-edge adds to the efficiency in that it exposes a fine thin rubber edge which first starts the process of self-vulcanization through exposure to air and friction. The patch is laid on the prepared surface of the tube and intimate contact is obtained by rubbing the outer surface of the patch with a knife-blade.

Having thus fully described our invention what we claim as new and wish to secure by Letters Patent of the United States, is:—

1. The process of patching rubber surfaces consisting in buffing the surface to which the patch is to be applied in the presence of a rubber softener and solvent rubbing the softener and solvent into the opened pores, then scraping and thoroughly removing all softener and solvent, leaving the treated surface clean and dry, and applying a soft clean rubber patch to the prepared surface, the surface of the tube and of the patch both being free from gasoline or cement coating.

2. The process of patching rubber surfaces which consists first in softening the surface to which the patch is to be applied with a suitable softening agent, then buffing the softened surface to remove the glaze and deteriorated rubber, then rubbing the softening agent into the pores of the rubber opened by the buffing operation, then scraping and thoroughly removing all softener and solvent, leaving the surface clean and dry, and then applying a clean soft surface of a rubber patch intimately to said prepared surface, the surface of the tube and of the patch both being free from gasoline or cement coating.

3. The process of patching rubber surfaces consisting in reducing the surface where the patch is to be applied to a clean, soft porous condition, then applying a soft clean sheet rubber patch to the prepared surface, the surface of the tube and of the patch both being free from gasoline or cement coating, the edge of said patch being cut on a bevel to a sharp edge on the contacting side of the patch.

4. The process of patching rubber surfaces consisting in buffing the surface to which the patch is to be applied in the presence of a rubber softener and its solvent, rubbing the softener and solvent into the opened pores, then scraping and thoroughly removing all softener and solvent, leaving the treated surface clean and dry and applying a soft clean rubber patch to the surface thus prepared, the surface of the tube and of the patch both being free from gasoline or cement coating, the edge of said patch being cut on a bevel to a sharp edge on a contacting side of the patch.

Signed at Indianapolis, Indiana, this the 12th day of July, 1921.

ROBERT M. BOWES.
CHARLES E. BOWES.